United States Patent [19]
Rud

[11] Patent Number: 5,497,270
[45] Date of Patent: Mar. 5, 1996

[54] APPARATUS AND METHOD FOR INCREASING RESOLUTION AND EXPANDING THE DISPLAYED FIELD OF VIEW

[75] Inventor: Mayer Rud, Sunnyvale, Calif.

[73] Assignee: Kaiser Aerospace & Electronics Corporation, Foster City, Calif.

[21] Appl. No.: 274,891

[22] Filed: Jul. 13, 1994

[51] Int. Cl.⁶ .......................... G02B 27/14; G02B 27/30
[52] U.S. Cl. .......................... 359/629; 359/630; 359/634; 359/636; 359/641
[58] Field of Search .................................. 359/629, 630, 359/631, 632, 633, 636, 638, 639, 465, 475, 471, 464; 348/115; 340/980; 345/7

[56] References Cited

U.S. PATENT DOCUMENTS

| | | | |
|---|---|---|---|
| 4,237,492 | 12/1980 | Roth | 359/629 |
| 4,281,341 | 7/1981 | Byatt | 348/57 |
| 4,361,384 | 11/1982 | Bosserman | 359/630 |
| 4,632,508 | 12/1986 | Connelly | 359/572 |
| 4,755,023 | 7/1988 | Evans | 345/8 |
| 4,761,056 | 8/1988 | Evans | 345/8 |
| 4,877,307 | 10/1989 | Kalmanash | 359/465 |
| 4,897,715 | 1/1990 | Beamon, III | 348/115 |
| 4,954,890 | 9/1990 | Park | 348/58 |
| 4,978,202 | 12/1990 | Yang | 359/465 |
| 5,007,715 | 4/1991 | Verhulst | 359/54 |
| 5,071,230 | 12/1991 | Hatano | 359/53 |

Primary Examiner—Georgia Y. Epps
Assistant Examiner—Ricky Mack
Attorney, Agent, or Firm—Marvin H. Kleinberg; Marshall A. Lerner; Michael J. Ram

[57] ABSTRACT

An apparatus and method for increasing resolution and expanding the displayed field of view. The imagery is collimated and split into two paths by a partially reflective mirror set at an oblique angle to the image source. Either path may be blocked by a combination of polarizers and at least one controllable polarization shifting cell(s) (π-cells). This mechanism allows one image source to supply, in alternating sequence, separate imagery to two separate but contiguous portions of a wide angle display. The two collimated image paths are merged about the viewing axis by a one way mirror before being recollimated at the device exit pupil.

11 Claims, 1 Drawing Sheet

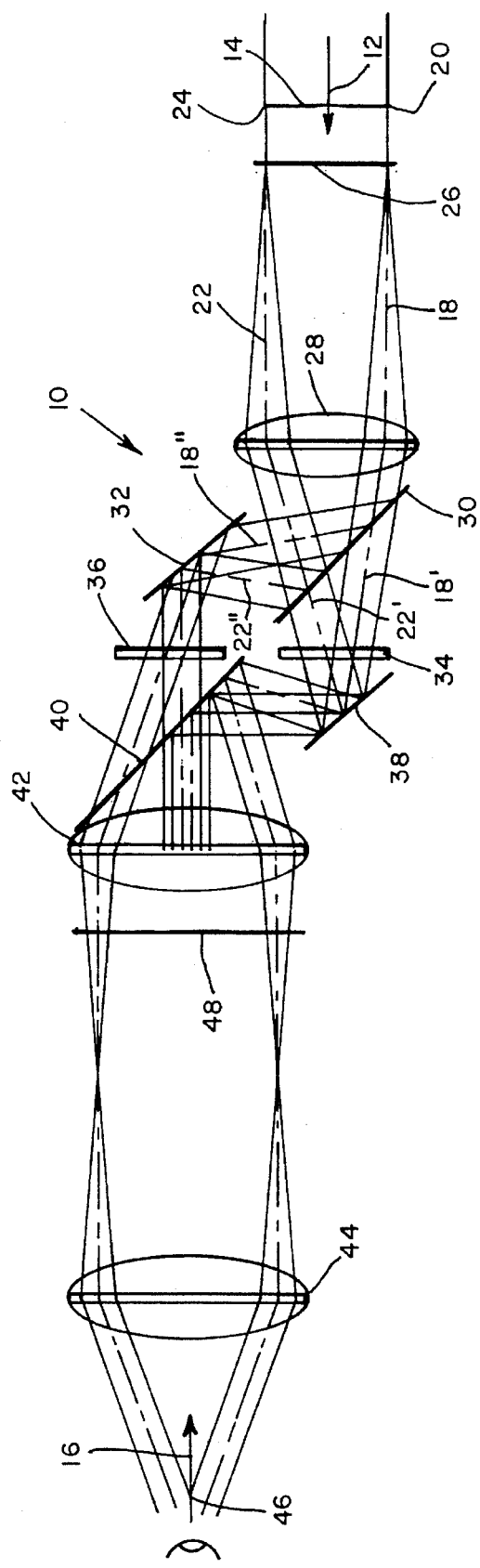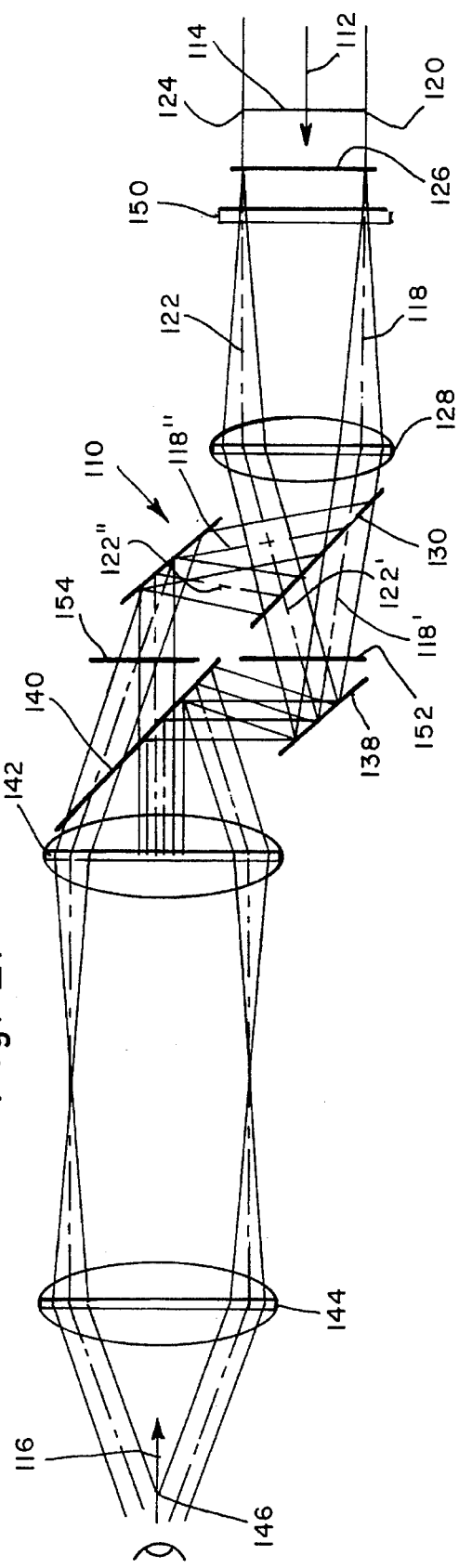

APPARATUS AND METHOD FOR INCREASING RESOLUTION AND EXPANDING THE DISPLAYED FIELD OF VIEW

BACKGROUND OF THE INVENTION

1. Field of the Invention

The present invention is generally related to imagery display systems and more specifically to an apparatus and method for increasing the resolution of a wide angle virtual reality display by projecting alternate image source frames onto different respective halves of the user's field of view, thereby expanding the field of view.

2. Review of the Prior Art

In a wide angle virtual reality or head mounted display, if the image source is made up of one unit (e.g. one CRT or one liquid crystal display), as is generally the case due to economics and scarcity of space, then for either an increased angular extent in the vertical or horizontal display, the fixed number of image source pixels must be "stretched" over an increased angular swath. For displays over 35° in angular extent this may create substantial granularity.

For instance, in the case of a virtual reality display, it may be desirable to show the viewer imagery over a horizontal angular extent of 40° in order to create a more realistic display. If this imagery is originated on an image source of limited width, however, and is then "stretched" to over 40° in angle, image granularity will result since the spacing between adjacent pixels will become noticeable.

For systems which store the imagery with a greater density of pixels than can be represented on a currently available image source screen, the single image source will prevent a display with enough pixel density to avoid the problem of granularity even though more information is available. Unfortunately, space and weight restraints may preclude the introduction of a second image source into the system.

One potential solution for this problem would be to display separately the left and right portions of the imagery in greater detail, alternately on the image source and then route these, alternately, to the viewer's left and right halves of field of view. The image persistency of the human eye would prevent the imagery from appearing "choppy."

Unfortunately, until now there has been no quick and easily controllable mechanism for switching an image from one path to another with precise timing. For the application just described, the switching must be accomplished at times on the order of 10 milliseconds. Mechanical system rarely work this quickly without enormous penalties in complexity and cost. Further, there is no discrete electrical component which performs the same function as a mirror which can be "toggled" between positions.

3. Prior Art References

Most of the prior art concerned with alternating imagery deals with stereoscopic displays. Because the problems encountered in that field are not the same as those described in the previous section, the prior art is inapposite.

In stereoscopic display systems, slightly different imagery must be provided to each eye. This is generally accomplished by sending a sequential series of alternating images for the right and left eyes and blocking each image from reaching the wrong eye. There is no necessity, however, to break the imagery up into different paths.

For example, U.S. Pat. No. 4,632,508, to Connelly, shows a device for presenting both of the viewer's eyes with coordinated imagery. This device, however, uses two separate image sources. This could be cumbersome, especially in an aircraft cockpit area already filled with equipment.

U.S. Pat. No. 4,281,341, to Byatt, discloses a stereoscopic television system which alternately produces horizontally and vertically polarized images. The viewer is provided with glasses that have one horizontally polarized lens and one vertically polarized lens. Each eye, therefore, receives only those images which correspond to that eye's perspective. This system, however, could not work for different fields of view. It does not reroute and change the angle of the images. Moreover, since there is no collimation, the images are not presented at virtual infinity.

The patent to Hatano et al., U.S. Pat. No. 5,071,230, discloses a liquid crystal display device. An image is formed by controlling LC grids and may be displayed on a screen using a beam-splitter and a lens. There is no effort here to direct the imagery to more than one path.

U.S. Pat. No. 4,954,890, to Park, projects distinctly polarized right and left eye images onto a screen to be read separately by the viewer's right and left eye equipped with appropriately polarized lenses. There is no effort to display information in different portions of the field of view.

U.S. Pat. No. 5,007,715, to Verhulst, discloses another stereoscopic display system. Although, an image generating system that is different than that of Byatt is used, the general technique is the same, with images produced that are toggled between one polarization and another. The viewer wears glasses in which the lenses are polarized in a mutually orthogonal manner.

In the patent to Bosserman, U.S. Pat. No. 4,361,384, a high luminance miniature display is taught. This device does not address the problem of how to switch imagery from one path to another. Rather, it addresses how to achieve a bright display in a very small area.

In the patent to Kalmanash, U.S. Pat. No. 4,877,307, a stereoscopic display system which utilizes circular polarization is disclosed. A liquid crystal cell introduces a controllable relative phase shifts between orthogonal light components, resulting in circular polarization with one of two predetermined directions of rotation. Each lens of the associated viewing glasses transmits only that circularly polarized light with a specific predetermined direction of rotation. By interleaving right eye and left eye images on the image source and alternately polarizing them with right hand and left hand circular polarization, a stereoscopic image is created for a user wearing the viewing glasses which transmit the right eye images to the right eye and the left eye images to the left eye.

U.S. Pat. No. 4,897,715, to Beamon III, is yet another stereoscopic viewing device. It has two different image forming devices, but, it does not address the problem of how to use one image source to obtain two different sets of images corresponding to two different parts of the field of view.

In U.S. Pat. No. 4,755,023, to Evans et al., (assigned to the assignee of the present invention) a headgear mounted display visor is shown which has a particularly beneficial shape and desirable characteristics. This reference does not consider the issue of sending imagery along a selectable path.

In a later patent to Evans et al., U.S. Pat. No. 4,761,056 (assigned to the present assignee) a Compact Helmet Mounted Display is taught which projects an image from a source to the eye along a fixed path.

SUMMARY OF THE INVENTION

The essence of the current invention is that the imagery is broken up into two paths by a partially reflective mirror. Either one of the paths may then be blocked depending on the display needs of the viewer(s). The controlled blocking of each path may be performed by a liquid crystal cell that is placed between entrance and exit polarizers. In the "open" state, the liquid crystal cell renders the polarization of the light it receives such that it will be transmitted through the exit polarizer. In the "closed" state, the polarization of the received light is shifted in such a manner that it will be blocked by the exit polarizer. Any other device which will controllably change the polarization of light may be used in place of a liquid crystal cell.

Another feature of the invention is that the incoming light is collimated (the rays of light are made parallel). This is necessary to permit the imagery to be shunted down a substantially long path without appreciable "spreading," and so that the final image will appear to be at virtual infinity.

In one embodiment, the imagery path switch is used in conjunction with an image source to broaden the field of view. The image source is controlled to alternately display two halves of the entire intended field of view. The imagery path switch is controlled to route each half field of view to the appropriate part of the viewer's field of view by alternately blocking the image paths. The image persistence of the human eye smooths the series of images in each half of the field of view so that any time gap between image updates is not noticeable.

BRIEF DESCRIPTION OF THE DRAWINGS

FIG. 1 shows a diagrammatic view of a preferred embodiment of the present invention;

FIG. 2 shows a diagrammatic view of an alternative embodiment of the present invention.

DETAILED DESCRIPTION OF THE PREFERRED EMBODIMENTS

FIG. 1 shows the preferred embodiment 10 of the present invention. The image source must be configured to display a sequence of images in which every "even" image corresponds to the left portion of the expanded field of view and every "odd" image corresponds with the right portion of the field of view (or vice versa).

This embodiment shunts the even images to the left of the viewer's field of view and presents the odd images at the right of the field of view (with no apparent break in the imagery). The image persistence of the human eye allows the interrupted sequence of images to appear to be uninterrupted. With this embodiment, one image source may display a wider field of view than would otherwise be possible without encountering significant granularity due to the finite number of pixels in the image source.

For ease of description, two axes are defined in FIG. 1. An image axis 12 is perpendicular to the plane described by the four corners of an image source 14. A viewing axis 16 defines the center of the perceived image.

The image source 14 emits a first beam of light 18 from the left most pixel 20 and emits a second beam of light 22 from the right most pixel 24. The beam of light emitted by the image source taken as a whole may be referred to as the "image light." This includes beams 18 and 22 as well as the light from all the other pixels. These beams 18, 22 are passed through a linear polarizer 26 and through collimating optics 28. The collimating optics 28 make the rays of light originating at the same point parallel, so that objects portrayed appear to be at virtual infinity. Beams 18, 22 next encounter a first partially reflective mirror or beam splitter 30, oriented at 45° relative to the image axis, which both partially transmits and partially reflects each beam.

A portion 18' of beam 18 is transmitted through the mirror 30. A reflected portion 18" is also created. Beam 22 is likewise split between transmitted and reflected portions 22', 22" respectively. The two reflected beams 18", 22", next encounter a first mirror 32 which is oriented at approximately 50° relative to the image axis 12. This orientation reflects the collimated beam 18" along the viewing axis 16. Sets of beams 18', 22' and 18", 22" pass through first and second π-cells 34 and 36 respectively. "π-cell" is defined here to mean an element which can controllably change the polarization of the light that impinges upon and is transmitted through it.

These π-cells are currently widely and easily available in the form of liquid crystal cells. It should be noted that, depending on the type of liquid crystal cell, the director axis of the cell (i.e., the axis along which the liquid crystal molecules align lengthwise) must either be aligned with the direction of the entrance polarizer (for a twisted nematic liquid crystal structure) or aligned at 45° to the direction of the entrance polarizer (for a straight or untwisted liquid crystal structure). The entrance polarizer, π-cell, exit polarizer combination is often referred to as a shutter mechanism, or a blocking mechanism because it controllably transmits light.

After passing through the first π-cell 34, beams of light 18', 22' are both reflected from a second mirror 38. This second mirror 38, which is also oriented at a approximately 50° angle with respect to the image axis, directs beams 18 and 22 toward a second partially reflective mirror or beam splitter 40 which is oriented at 45° with respect to the image axis 12. This is the correct angle to direct the collimated beam of light 18', which corresponds to the left most point on the image source, to be centered on the viewing axis 16.

Beams 18" and 22" pass through the second partially reflective mirror 40 after exiting the second π-cell 36. Because of the collimated width of the beams, there is some overlap between beam 18' and beam 22" as they exit the device.

The beams 18', 18", 22', 22" next travel through the eyepiece optical elements 42 and 44, which reorient beams 18', 18", 22', 22" so that an exit pupil 46 is formed at the appropriate spot. The design of optical elements to perform these functions is well known to those skilled in the art of optical science.

The beams also travel through exit linear polarizer 48 which, in this embodiment, is placed between optical elements 42 and 44. It is the combination of π-cells and linear polarizers which allow the image to be toggled between a left half and a right half. When the left π-cell 36 renders the polarization of light such that it may pass through the exit polarizer 48, the image from the image source 12 is displayed to the left field of view. Under these conditions, the right π-cell 34 is controlled so that it renders the polarization of the light transmitted through it such that it is blocked by exit polarizer 48. To display in the right half of the field of view, the π-cells are controlled for the opposite result. By controlling the π-cells in coordination with the imagery, the viewer may see the entire wide field of view with no increase in granularity.

A number of different schemes are possible for each entrance polarizer, π-cell, exit polarizer combination, based on the available technology of liquid crystals and light wave manipulation. For a π-cell which includes a liquid crystal cell with a twisted nematic (TN) structure, the entrance polarizer must be oriented so that its axis of polarization is parallel to the direction in which the liquid crystal molecules align lengthwise at the front of the liquid crystal cell. This is defined as the director axis.

When no voltage is applied to a TN liquid crystal cell, the light which enters the cell polarized parallel to the director axis has its polarization shifted by 90°. Therefore, the exit polarizer should have its axis of polarization aligned either parallel or orthogonally to the director axis. With the first case the exit polarizer will pass the light from the liquid crystal cell (LCC) when the cell has a "full scale" voltage applied to it, suppressing a polarization shift. In the second case the exit polarizer will pass the light when no voltage is applied to the liquid crystal cell and a 90° phase shift results.

Another type of liquid crystal cell controllably phase shifts the light parallel to its director axis (parallel component) relative to the light that is orthogonal to its director axis (orthogonal component). If the entrance polarizer is set at 45° relative to the director axis the parallel and orthogonal components of light will be equal after passing through this device. A 180° relative phase shift of this light reflects the polarization vector about the orthogonal axis, resulting in a 90° shift in the direction of polarization.

Therefore, if the entrance and exit polarizers are identically oriented at a 45° angle to the LCC director axis, a zero volt input to the LCC, which results in the maximum 180° phase shift, will cause the light to be blocked by the exit polarizer. A voltage of magnitude large enough to drive the LCC to a state where it causes no shift in the relative phase will cause the light to be passed by the exit polarizer. If the exit polarizer is oriented with its axis of polarization perpendicular to that of the entrance polarizer, the "on" and "off" states are reversed.

This type of liquid crystal also makes it possible to design a system based on circular polarization. In the prior example, if the relative phase shift between the orthogonal and parallel components was 90°, the resultant light would be circularly polarized. Likewise, the introduction of a 270° phase shift would also cause circular polarization but in the opposite direction.

Furthermore, it is possible to construct polarizers from cholesteric liquid crystals, which will accept circularly polarized light only if it is polarized in a particular direction of rotation. Therefore, an LCC of the relative phase shifting variety along with an entrance linear polarizer which is oriented with its axis of polarization at 45° with respect to the director axis and exit polarizer which accepts circularly polarized light only if it has a counterclockwise direction of rotation will transmit light when the LCC introduces a 90° phase shift but will block light when the LCC introduces a 270° phase shift. U.S. Pat. No. 4,877,307 contains further information on the use of circularly polarized lenses. It is incorporated here by reference.

FIG. 2 shows an alternative embodiment 100 which serves the same purpose as the embodiment shown in FIG. 1. For ease of description like elements are identified with the same number as in FIG. 1 but with 100 added to it, with the exception of elements 152, 154". In this embodiment each primed element performs the same function as the corresponding element in the embodiment shown in FIG. 1. For the sake of brevity, only the differences are discussed here.

An entrance π-cell 150 has been added after the entrance linear polarizer 114. Additionally, the two π-cells labeled 34 and 36 in FIG. 1 have been removed. In their place are first and second polarizers 152 and 154. The first polarizer 152 has its transmissive axis oriented parallel to that of the entrance polarizer, whereas the second polarizer 154 is oriented with its transmissive axis perpendicular to this. The exit polarizer 48 of FIG. 1 has also been removed. In this embodiment, the linear polarizer 114, the entrance π-cell 150 and the first and second polarizers 152, 154 comprise the blocking mechanism.

When the π-cell 150 is in its nonpolarization shifting state, the light impinging on the polarizers 152, 154 will be polarized parallel to the entrance polarizer. Therefore, the first polarizer 152 will transmit the light and the second polarizer 154 will block the light. When the π-cell 15 is in a state where it shifts the polarity of impinging light by 90° the first polarizer 152 will block the light and the second polarizer 154 will transmit the light.

It will be appreciated by those skilled in the art that the orientations of the first and second polarizers may be switched. Also, as discussed above, a twisted nematic or non-twisted liquid crystal may be used with appropriate orientation of the associated polarizers. Also, circular polarization may be used, with the exit polarizers each transmitting light that was circularly polarized with a predetermined direction of rotation.

What I claim is:

1. An apparatus for displaying an expanded field of view of an image by the spatially aligned combination of two alternatively displayed sets of sequential images from an image source positioned at the front end of the apparatus and emitting a first image beam, the apparatus having an image display plane with an image axis orthogonal to the image display plane and a viewing axis defining the center of a user's perceived field of view, the apparatus comprising:

beam splitting means for dividing said first image beam into second and third identical beams of light directed along different paths;

blocking means for controlling the passage of said second and third beams of light said blocking means alternatively transmitting and blocking images from each of said paths;

a first collimating optical assembly positioned along the image axis between the image source and said beam splitting means;

directing means for applying said second and third beams of light to a user along the viewing axis;

exit optics, for recollimating said second and third beams of light and focusing them at an exit pupil;

wherein a sequence of images displayed by the image source are alternatively directed to first and second portions of a user's field of view.

2. The apparatus of claim 1 wherein said blocking means include, separately interposed into the path of said second and third beams of light, a first or entrance polarizer, a liquid crystal cell, and a second or exit polarizer.

3. The apparatus of claim 1 wherein said directing means comprise a collection of mirrors, one of which is a partially reflective mirror.

4. The apparatus of claim 1 wherein said first collimating optical assembly comprises a collimating lens.

5. The apparatus of claim 1 further including means to coordinate said blocking means with the image source so that preselected alternative images are directed to predetermined image paths.

6. An apparatus for displaying an expanded field of view of an image by the spatially aligned combination of two alternatively displayed sets of sequential images from an image source positioned at the front end of the apparatus and emitting a first image beam, the apparatus having an image display plane with an image axis orthogonal to the image display plane and a viewing axis defining the center of a user's perceived field of view, the apparatus comprising:

beam splitting means for dividing said first image beam into second and third identical beams of light directed along different paths;

blocking means for controlling the passage of said second and third beams of light said blocking means alternatively transmitting and blocking images from each of said paths;

said blocking means including, interposed into the path of said first beam of light, a first entrance polarizer and, separately interposed into the path of each of said second and third beams of light, a liquid crystal cell and a second exit polarizer, wherein the exit polarizer for said second beam of light is oriented with its transmissive axis orthogonal to that of the exit polarizer for said third beam of light;

a first collimating optical assembly positioned along the image axis between the image source and said beam splitting means;

directing means for applying said second and third beams of light to a user along the viewing axis; and exit optics, for recollimating said second and third beams of light and focusing them at an exit pupil;

wherein a sequence of images displayed by the image source are alternatively directed to first and second portions of a user's field of view.

7. An apparatus for displaying an expanded field of view of an image by the spatially aligned combination of two alternatively displayed sets of sequential images from an image source positioned at the front end of the apparatus and emitting a first image beam, the apparatus having an image display plane with an image axis orthogonal to the image display plane and a viewing axis defining the center of a user's perceived field of view, the apparatus comprising:

beam splitting means for dividing said first image beam into second and third identical beams of light directed along different paths;

blocking means for controlling the passage of said second and third beams of light said blocking means alternatively transmitting and blocking images from each of said paths;

said blocking means comprising an entrance polarizer interposed into the path of said first beam of light and, separately interposed into the paths of each of said second and third beams of light, a liquid crystal cell and an exit polarizer;

a first collimating optical assembly positioned along the image axis between the image source and said beam splitting means;

directing means for applying said second and third beams of light to a user along the viewing axis; and exit optics, for recollimating said second and third beams of light and focusing them at an exit pupil;

wherein a sequence of images displayed by the image source are alternatively directed to first and second portions of a user's field of view.

8. An apparatus for displaying an expanded field of view having an image display plane and having an image axis orthogonal to the image display plane with a viewing axis defining the center of a user's perceived field of view, said apparatus comprising:

an image source aligned with the image display plane;

first partially reflective mirror means interposed along the image axis in the path of a beam of light emitted by said image source, said mirror means being oriented obliquely with respect to the image axis so that first and second identical but differently directed beams of light result from a beam of light impinging upon said mirror means from said image source;

a first controllable polarization shifting device interposed in the path of said first beam;

a second controllable polarization shifting device interposed in the path of said second beam;

a first collimating optical assembly, positioned along the image axis between said image source and said partially reflective mirror means;

at least one entrance polarizer placed between said image source and said polarization shifting devices for polarizing impinging light;

at least one exit polarizer placed between each of said first and second polarization shifting devices and a user; and display mirror means including a second partially reflective mirror, said display mirror means cooperatively oriented so that collimated beams of light separated by said first partially reflective mirror means are directed to the user about the viewing axis;

wherein said polarization shifting devices are controlled to alternatively transmit and block images from each path so that a sequence of images displayed by the image source are alternatively directed to first and second portions of the user's field of view.

9. A method for expanding in one angular dimension a projected image, the method including the steps of:

displaying a sequence of frames on an image source in which alternate frames correspond to a first portion of a total field of view and to a second portion of the total field of view, respectively;

collimating the light emitted by the image source;

passing said collimated light through a partially reflective mirror to produce substantially identical but differently directed first reflected and second transmitted beams;

directing said first beam to occupy a first portion of a user's field of view;

directing said second beam to occupy a second portion of the user's field of view;

focusing both beams at the intended eye location of the user;

alternately blocking said first beam and said second beam to create first and second sequences of odd and even frames, respectively.

10. The method of claim 9 in which the step of collimating the light emitted by the image source is accomplished by passing said light through a collimating lens mechanism.

11. The method of claim 9 in which the step of blocking said first beam and second beams is accomplished by applying said beams to first and second liquid crystal shutter mechanisms respectively, said mechanisms comprising a liquid crystal cell between two substantially identically oriented polarizers.

* * * * *